United States Patent Office
3,479,412
Patented Nov. 18, 1969

3,479,412
PROCESS FOR THE CONDENSATION OF
PRIMARY ALCOHOLS
Gianfranco Pregaglia, Guglielmo Gregorio, and Francesco Conti, Milan, Italy, assignors to Montecatini Edison S.p.A., Milan, Italy, a corporation of Italy
No Drawing. Filed July 19, 1967, Ser. No. 654,337
Claims priority, application Italy, July 21, 1966, 16,798/66
Int. Cl. C07c 31/02, 31/14
U.S. Cl. 260—642    4 Claims

ABSTRACT OF THE DISCLOSURE

Process for condensation of primary alcohols of the formula R—$CH_2$—$CH_2$—OH wherein R is alkyl, cycloalkyl, or aryl, mixtures of said alcohols, or mixtures of said alcohol(s) with an alcohol branched in the alpha position with respect to the carbon atom bound to the hydroxy group. The condensation is carried out at 80 to 220° C. and the alcohol contains alkaline material dissolved therein. Catalyst used is soluble metal compound wherein the metal is of the platinum series, along with a ligand which is an organic compound of phosphorus, arsenic, or antimony.

BACKGROUND OF THE INVENTION

Field of the invention

The present invention relates to an improvement in a process for the preparation of primary alcohols having a branched chain in the 2 position by using alcohols having a lower molecular weight.

Description of the prior art

Heretofore it has been known to react two alcohols whereby the reaction proceeds with elimination of a water molecule from two alcohol molecules, according to the following scheme:

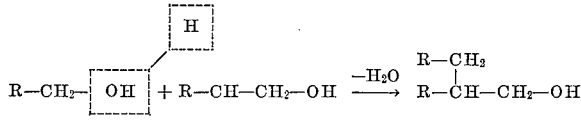

This reaction scheme is typical of the Guerbet reaction [see Ang. Chem. 64, 213 (1952)], which reaction occurs at a high temperature by heating the alcohols in the presence of an alkaline material and gradually removing water as it is formed. The condensing agents for this reaction are alkoxides and hydroxides of alkali metals, which agents are active when used at temperatures of from about 200° to 300° C. The operating pressure must be sufficient to keep the reactants in the liquid state.

In order to operate under less drastic conditions various methods have been developed, based on the use of catalysts of heavy metals and their oxides which when present in suspension in the reaction medium, make it possible to have an appreciable reaction rate even at temperatures of the order of 120–180° C. [see Comptes Rendus, 233, 1466 (1951)].

In U.S. patent application Serial No. 638,617, filed May 15, 1967, the contents of which are incorporated herein by reference, there is described the use as catalysts of noble metals, e.g., palladium, either alone or deposited on a non-metal support such as, e.g., coal, whereby the process can be carried out at temperatures a little higher than 100° C.

In the foregoing cases, the reaction medium is characterized by the presence of a solid phase. This makes rather complex and difficult the recycling of the catalyst, due in part to its tendency to adhere to the walls of the reactor. In general, it would be extremely desirable to operate in a homogeneous phase but, on the other hand, it is known that in alkaline solution (wherein the metal catalyst is not present in suspension), the reaction rate is virtually nil at temperatures as high as 180° C.

SUMMARY OF THE INVENTION

We have now surprisingly found that the dimerization reaction can be carried out at a temperature of the order of 100° C. in a homogeneous alkaline solution, by using as catalysts compounds of metals of the platinum series, which compounds are soluble in the reaction medium.

A further advantage of operating according to the present invention arises from the technological simplification of the process since, by operating in a homogeneous phase, there are no problems created due to the necessity of first dispersing uniformly the catalyst in the reaction mass and then processing the suspensions thus obtained in successive stages. These advantages are obtained even though the reaction temperatures and rates are at least of the same order as those of the processes known heretofore.

The present process therefore relates to an improvement in the process for the condensation of alcohols or mixtures of primary alcohols at least one of which is of the general formula R—$CH_2$—$CH_2$—OH, wherein R is an alkyl, cycloalkyl or aryl radical containing 1 to 16 carbon atoms, with the obtaining of primary alcohols having a branched chain in the 2 position. The process comprises carrying out the reaction in a homogeneous phase, by heating to a temperature of from about 80° to 220° C., preferably from about 110° to 180° C., the foregoing alcohols or mixtures of alcohols, an alkaline material having been dissolved therein, and employing as the catalyst a soluble compound of a metal selected from the group consisting of rhodium, iridium, ruthenium, osmium, palladium, platinum and mixtures of compounds of the said metals, in an amount of from about 0.001 to 5 molar percent with respect to the alcohol, preferably between 0.05 and 2% by mols, and a ligand desirably in an amount of from 2 to 5 mols of ligand per gram atom of metal, the ligand being selected from the group consisting of organic compounds of phosphorus, arsenic and antimony in the trivalent state and having the general formula

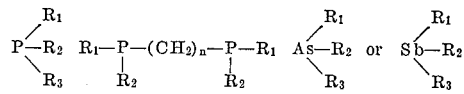

wherein $R_1$, $R_2$ and $R_3$ may be the same or different radicals and are selected from the group consisting of alkyl, aryl or cycloalkyl radicals containing 1 to 8 carbon atoms, and n is a whole number from 2 to 4.

DESCRIPTION OF THE PREFERRED EMBODIMENTS

An excess of the ligand (beyond the range indicated above) does not hinder the reaction but offers no particular advantage.

The ligands that can be used according to the present invention include triphenylphosphine, diphenylethylphosphine, tributylphoshpine, triphenylarsine, tributylarsine, p,p' - tetraethyl - ethylene diphosphine, tetraethyldiphosphinobutane, triethylphosphine, etc.

Suitable metal compounds include rhodium chloride hydrate, ammonium chloroiridiate, ruthenium chloride hydrate, ammonium chlororuthenate, palladium bromide, chloroplatinic acid, ammonium chloroplatinate, ammonium chloroplatinite, sodium chloro-osmate, tetracarbonyl-dichloro-di-rhodium [Cl(CO)$_2$Rh - Rh(CO)$_2$Cl], etc.

The alcohols that can be used in the dimerization reaction according to the present invention include propanol, n-butanol, amyl alcohol, isoamyl alcohol, normal-hexanol, normal-dodecanol, stearyl alcohols, phenylethyl alcohol, etc., or mixtures of any of the foregoing with an alcohol which is branched in the alpha position with respect to the carbon atom bound to the hydroxy group, e.g. isobutyl alcohol, benzyl alcohol, 2-ethyl hexanol, or the like. Preferred is the use in the dimerization reaction of non-branched alcohols, due to their greater rate of reaction with respect to alcohols branched in the alpha position.

The alkaline material soluble in the alcohol to be condensed may be a hydroxide or an alkoxide of an alkali metal, or a material which will be transformed thereto under the reaction conditions, and is used in an amount of from about 0.1 to 50 mol percent, preferably from about 2 to 10 mol percent, with respect to the alcohol. Suitable alkaline materials include metallic sodium, metallic potassium, sodium hydroxide, sodium amide, potassium amide, potassium hydroxide, sodium and potassium alkoxides, lithium hydroxide, and the like.

One of the problems encountered in carrying out the reaction is the removal of water formed during the reaction. This operation is usually carried out by means of dehydrating agents, e.g., alkyl borates, or by azeotropic distillation. When operating under atmospheric pressure or under a pressure slightly higher than atmospheric pressure, azeotropic distillation is particularly convenient since the use of fractionating columns resistant to high pressure is not required. The present technique is therefore particularly suitable for the dimerization of alcohols containing 4 or 5 carbon atoms and boiling between 110° and 140° C., although it can of course also be applied to alcohols containing up to 18 carbon atoms.

The unreacted alcohol is easily separated from the reaction product by distillation and the latter is washed with water before subsequent distillation. The catalyst, in the form of a soluble complex of the metal, represents the distillation residue. It is recycled to condense additional alcohols.

The alcohols obtained are useful in the production of and as plasticizers when esterified with dicarboxylic acids and also in the production of detergents when converted into the corresponding sodium alkyl sulphates.

The following examples illustrate the invention without limiting its scope.

Example 1

3.0 g. of rhodium trichloride hydrate and 9 g. of tributylphosphine were dissolved in 162 g. (2.2 mols) of boiling n-butanol. 3.5 g. of sodium hydroxide were added and the water-butanol azeotrope was separated by means of a Widmark column so as to remove water before recycling butanol. After a few minutes, the sodium hydroxide was completely dissolved and about 1 cc. of water separated at the head of the column. Thereafter, the water separation proceeded more slowly. Heating at the boiling point was carried out for 14 hours. At the end of the reaction the solution was washed with water and the reaction products were fractionated.

55 g. of butanol containing traces of aldehydes were recovered together with 70.5 g. of 2-ethylhexanol having a purity of 97% (analysis by gas chromatography).

There remained a high boiling residue of 11 g. in which the rhodium-phosphine complex was dissolved.

Example 2

110 mg. of (NH$_4$)$_2$PtCl$_4$ and 500 mg. of triphenyl phosphine were dissolved in 100 cc. of boiling n-butanol. After the addition of an additional 100 cc. of n-butanol containing 60 millimols of sodium butoxide, the solution was heated to the boiling point and the water-butanol azeotrope was distilled, recycling butanol to the reaction zone.

After 25 hours at the boiling point, 5.6 cc. of water were separated. Heating was stopped and the sodium salts were eliminated by passing a CO$_2$ stream through the reaction medium.

The precipitate was separated by centrifuging, followed by recovering the unreacted n-butanol by rectification and, under reduced pressure, 15.5 g. of 2-ethylhexanol.

The 2-ethylhexanol contained about 5% of an unidentified product, having a boiling point very close to that of the 2-ethylhexanol.

Example 3

500 mg. of (NH$_4$)$_2$RuCl$_6$ and 1.6 g. of tributylphosphine were dissolved in 80 cc. of n-butanol and this solution was added to a solution of 0.9 g. of sodium in 120 cc. of n-butanol.

By operating as described in Example 1, 5.8 cc. of water were collected within 60 hours. The sodium salts were then precipitated with CO$_2$, and NaCO$_3$ was separated by centrifuging.

36 g. of 2-ethylhexanol were obtained, the other products being n-butanol and a small amount (4 g.) of a high boiling product.

Example 4

To a solution of 350 mg. of IrCl$_3$ hydrate in 50 cc. of n-amyl alcohol containing 1.2 cc. of diethylphenylphosphine, there were added 150 cc. of n-amyl alcohol containing in solution 60 mmols of potassium butoxide.

The solution was heated to the boiling point, removing the water-alcohol azeotrope and recycling the alcohol to the reaction zone.

After 30 hours the mixture was analyzed by gas chromatography and was shown to contain the starting alcohol (80%) and an alcohol having 10 carbon atoms (15%), namely, 2-n-propylheptanol.

Example 5

3 millimols of rhodium chloride hydrate were dissolved in 100 cc. of n-butanol containing 12 millimols of tributylarsine. To the solution thus prepared, an additional 100 cc. of butanol containing 30 millimols of sodium butoxide were added.

A small amount of flocky precipitate was separated by filtration and a dark homogeneous solution was thus obtained. This was heated to the boiling point, separating the water-butanol azeotrope and recycling butanol to the reaction zone. After 50 hours at the boiling point, the unreacted butanol was removed and the residue was analyzed, showing the presence of 4.5 g. of 2-ethylhexanol.

Example 6

200 cc. of a solution of 1.5 millimols of rhodium chloride hydrate and 3 millimols of tetraethyldiphosphinobutane in 160 g. of n-butanol containing 3% of sodium butoxide were prepared.

The solution was reacted as described in Example 1 (distillation of the water-butanol azeotrope and recycle of butanol).

After 50 hours of reaction, the unreacted butanol was distilled off and the residue was subjected to distillation under reduced pressure, thus separating 22.8 g. of 2-ethylhexanol from 1.8 g. of high boiling products which included the rhodium-phosphine complex formed during the reaction.

Example 7

380 mg. (1 mmol) of tetracarbonyldichlorodirhodium and 950 mg. (8 mmol) of triethylphosphine were dissolved in 100 cc. of n-butanol. After addition of an additional 100 cc. of n-butanol containing 60 mmol of sodium butoxide, the solution was heated to the boiling point and the water-butanol azeotrope was distilled, recycling the butanol to the reaction zone.

After 8 hours the mixture was cooled, washed with water, and distilled. 18.2 g. of 2-ethylhexanol were obtained and the remaining unreacted n-butanol was recovered.

The rhodium-phosphine complex remained in the distillation residue.

Example 8

Example 7 was repeated, the only difference being that in place of pure n-butanol there was employed n-butanol containing 10% by weight of isobutanol. 16 g. of 2-ethylhexanol were obtained containing 3% of 2-ethyl-4-methylpentanol.

Variations can, of course, be made without departing from the spirit and scope of the present invention.

Having thus described our invention, what we desire to secure and hereby claim by Letters Patent is:

1. A process for the condensation of a primary alcohol of the formula R—$CH_2$—$CH_2$—OH or mixtures of primary alcohols at least one of which is of the formula R—$CH_2$—$CH_2$—OH, wherein R is an alkyl radical containing from 1 to 16 carbon atoms, to obtain primary alcohols having a branched chain in the 2-position, comprising carrying out the reaction in homogeneous phase by heating to a temperature of from about 80 to 220° C. a reaction mixture comprising said alcohol or mixture of alcohols, an alkaline material selected from the group consisting of alkali metals, alkali metal hydroxides, alkali metal alkoxides, and alkali metal amides dissolved in said alcohol or alcohol mixture, a soluble metal catalyst selected from the group consisting of rhodium chloride hydrate, ammonium chloroiridate, ruthenium chloride hydrate, ammonium chlororuthenate, palladium bromide, chloroplatinic acid, ammonium chloroplatinate, sodium chloro-osmate and tetracarbonyl-dichloro-di-rhodium, said soluble metal catalyst being present in an amount of from about 0.001 mol percent to 5 mol percent with respect to the alcohol, and a ligand selected from the group consisting of organic compounds of phosphorus, arsenic and antimony in the trivalent state and of the general formula

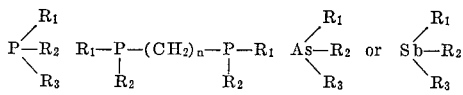

wherein $R_1$, $R_2$ and $R_3$ are the same or different radicals selected from the group consisting of alkyl, aryl and cycloalkyl radicals containing 1 to 8 carbon atoms, and wherein $n$ is a whole number from 2 to 4, the ligand being present in an amount of from about 2 to 5 mols of ligand per gram atom of metal of said soluble metal catalyst.

2. The process of claim 1 wherein the ligand is selected from the group consisting of triphenylphosphine, diphenylethylphosphine, tributylphosphine, triphenylarsine, tributylarsine, diethylphenylphosphine, p,p'-tetraethyl-ethylenediphosphine, tetraethyldiphosphinobutane and triethylphosphine.

3. The process of claim 1 wherein the said alcohol contains 4 or 5 carbon atoms.

4. The process of claim 1 wherein the temperature is from about 110 to 180° C. and wherein the soluble metal catalyst is present in amount of from about 0.05 to 2 mol percent with respect to the alcohol.

References Cited

UNITED STATES PATENTS

| | | | |
|---|---|---|---|
| 2,549,470 | 4/1951 | Howk et al. | 260—642 |
| 2,865,963 | 12/1958 | Garetson et al. | 260—642 |
| 3,248,432 | 4/1966 | Riley et al. | 260—642 |

FOREIGN PATENTS

| | | |
|---|---|---|
| 766,677 | 1/1957 | Great Britain. |

LEON ZITVER, Primary Examiner

J. E. EVANS, Assistant Examiner

U.S. Cl. X.R.

260—617, 619, 632